April 30, 1968  B. L. JOHNSON ET AL  3,380,102
ROTARY SOOT BLOWER

Filed Sept. 30, 1964  8 Sheets-Sheet 1

INVENTORS
BURFORD L. JOHNSON
ROBERT P. GILLETTE
BY John Mauer, III
ATTORNEY

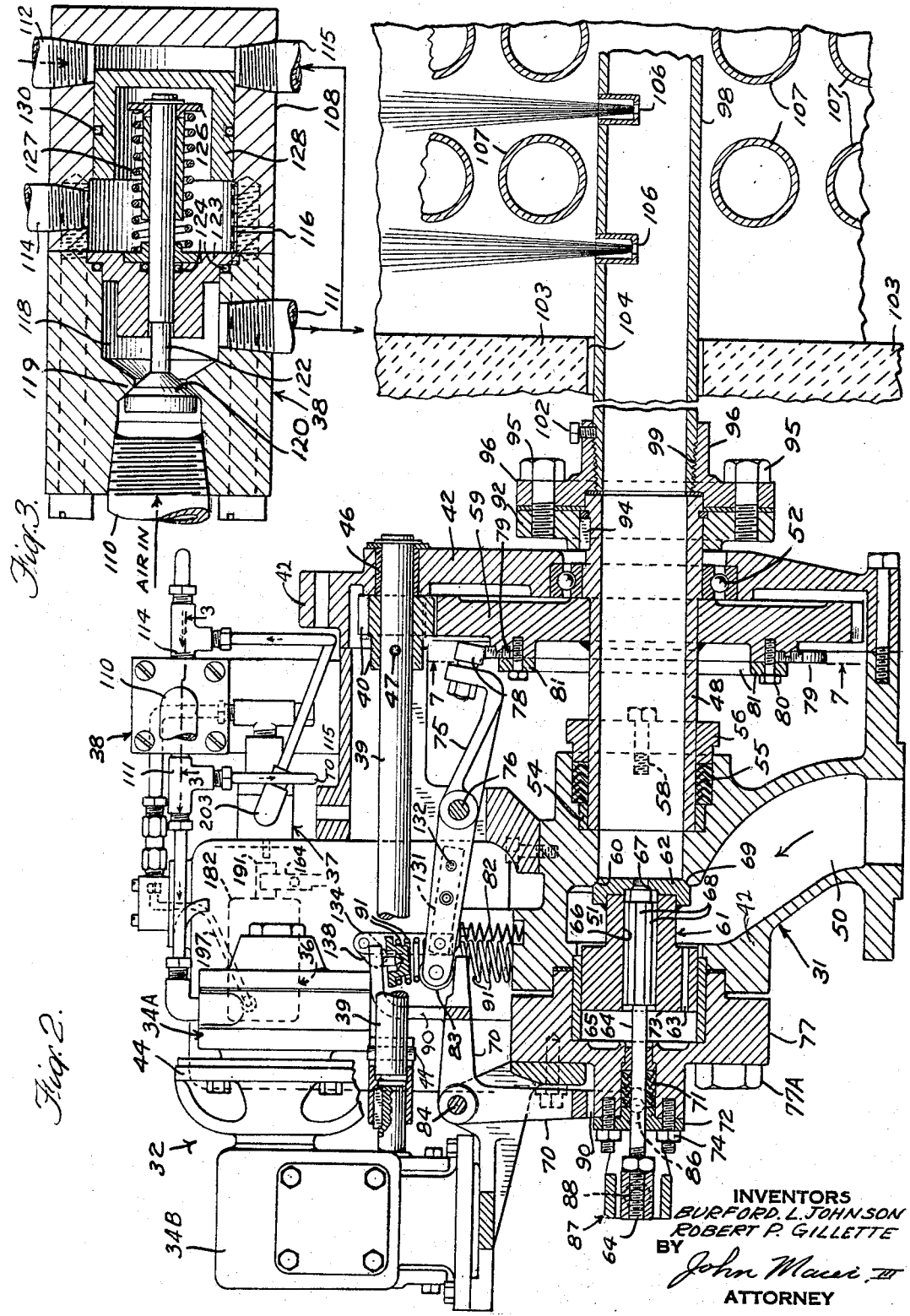

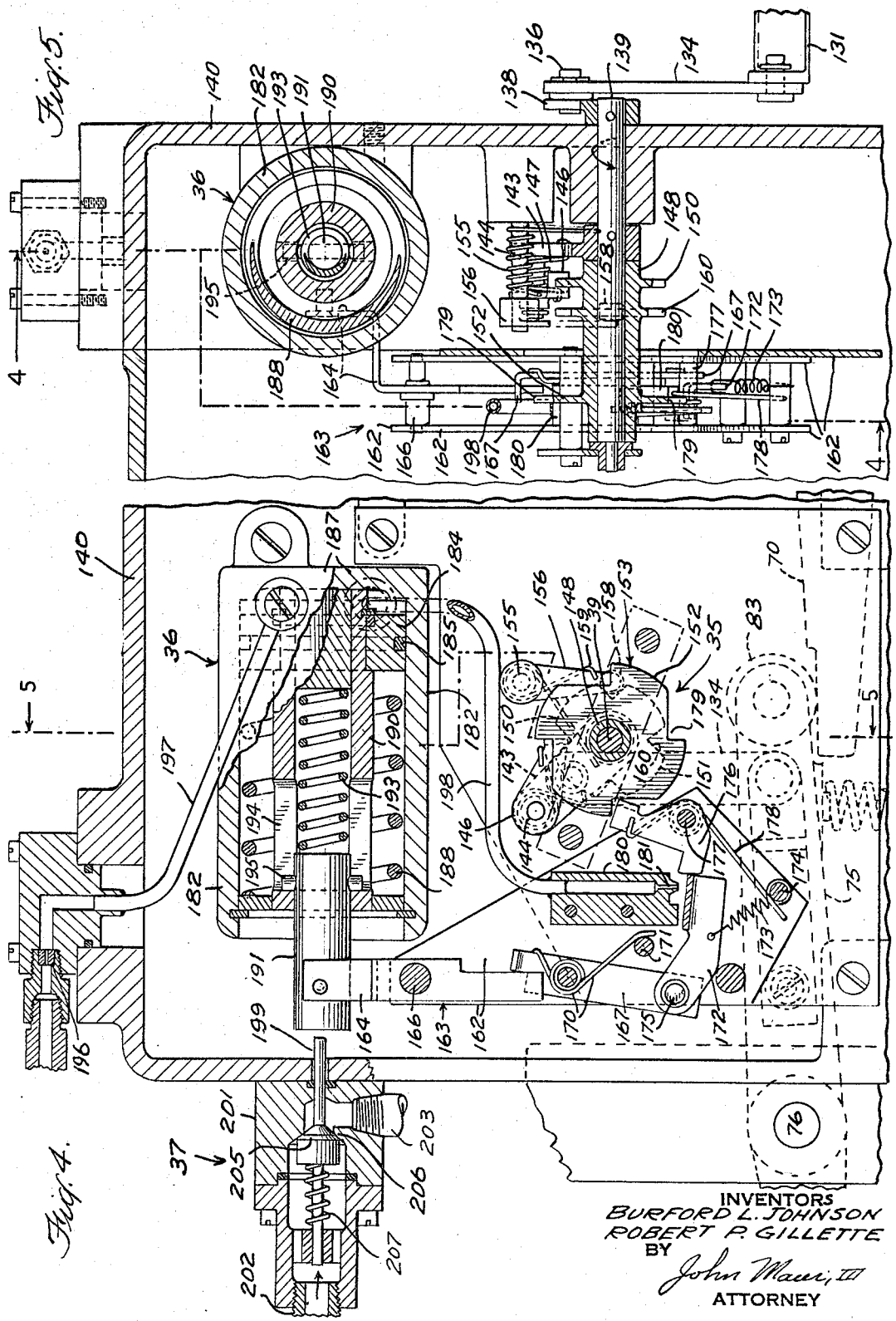

April 30, 1968     B. L. JOHNSON ET AL     3,380,102
ROTARY SOOT BLOWER
Filed Sept. 30, 1964     8 Sheets-Sheet 4
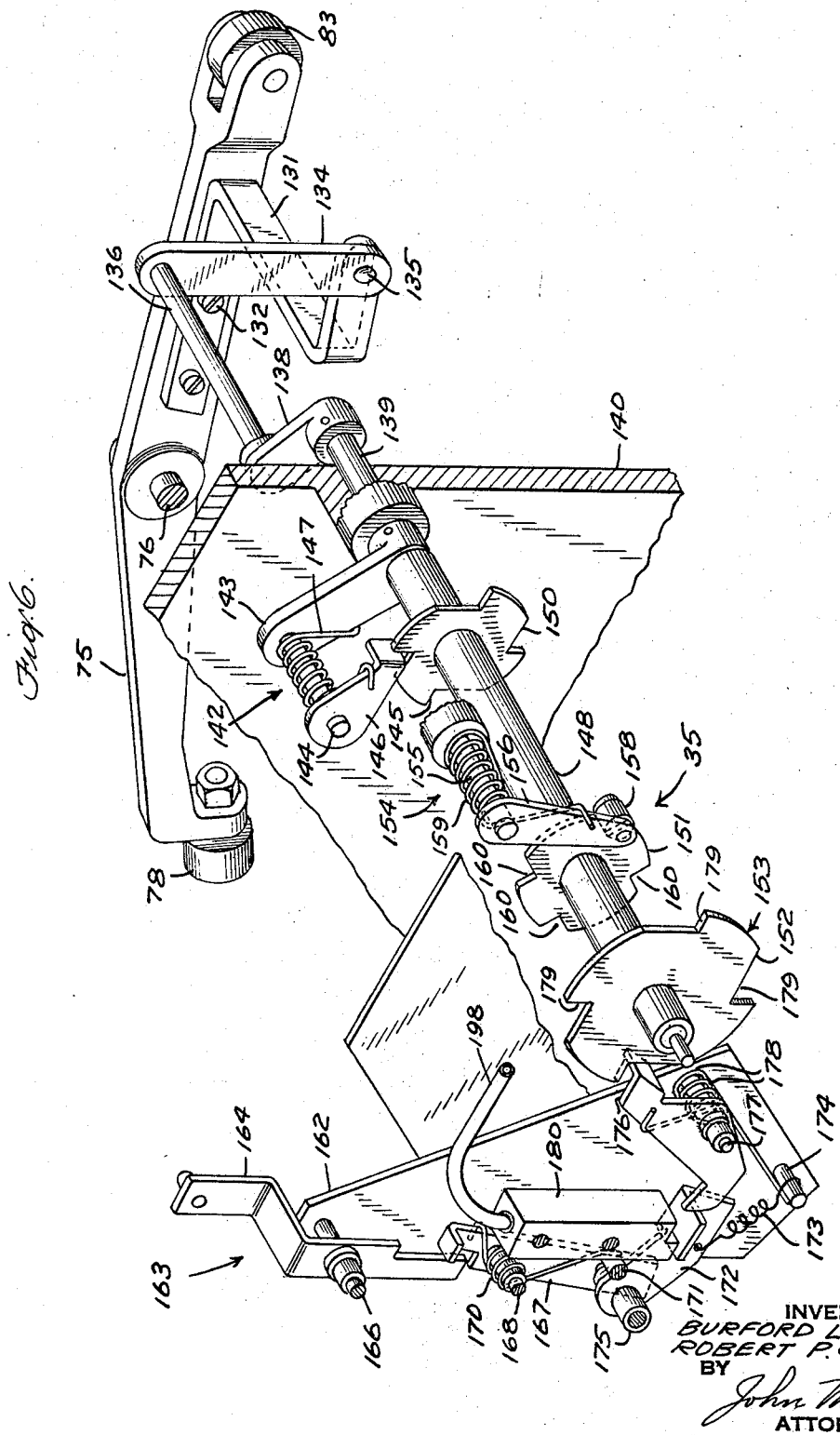
INVENTORS
BURFORD L. JOHNSON
ROBERT P. GILLETTE
BY
*John Maier, III*
ATTORNEY April 30, 1968  B. L. JOHNSON ET AL  3,380,102
ROTARY SOOT BLOWER Filed Sept. 30, 1964  8 Sheets-Sheet 6

INVENTORS
BURFORD L. JOHNSON
ROBERT P. GILLETTE
BY
John Mauer III
ATTORNEY

April 30, 1968 B. L. JOHNSON ETAL 3,380,102
ROTARY SOOT BLOWER
Filed Sept. 30, 1964 8 Sheets-Sheet 6

INVENTORS
BURFORD L. JOHNSON
ROBERT P. GILLETTE
BY
John Maui
ATTORNEY

April 30, 1968 B. L. JOHNSON ET AL 3,380,102
ROTARY SOOT BLOWER
Filed Sept. 30, 1964 8 Sheets-Sheet INVENTORS
BURFORD L. JOHNSON
ROBERT P. GILLETTE
BY
John Mauer III
ATTORNEY

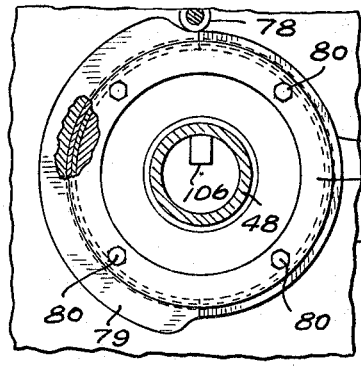
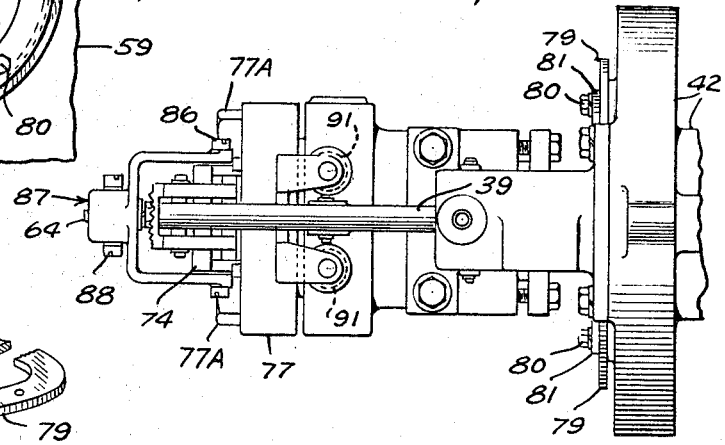
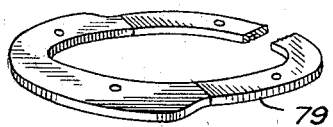
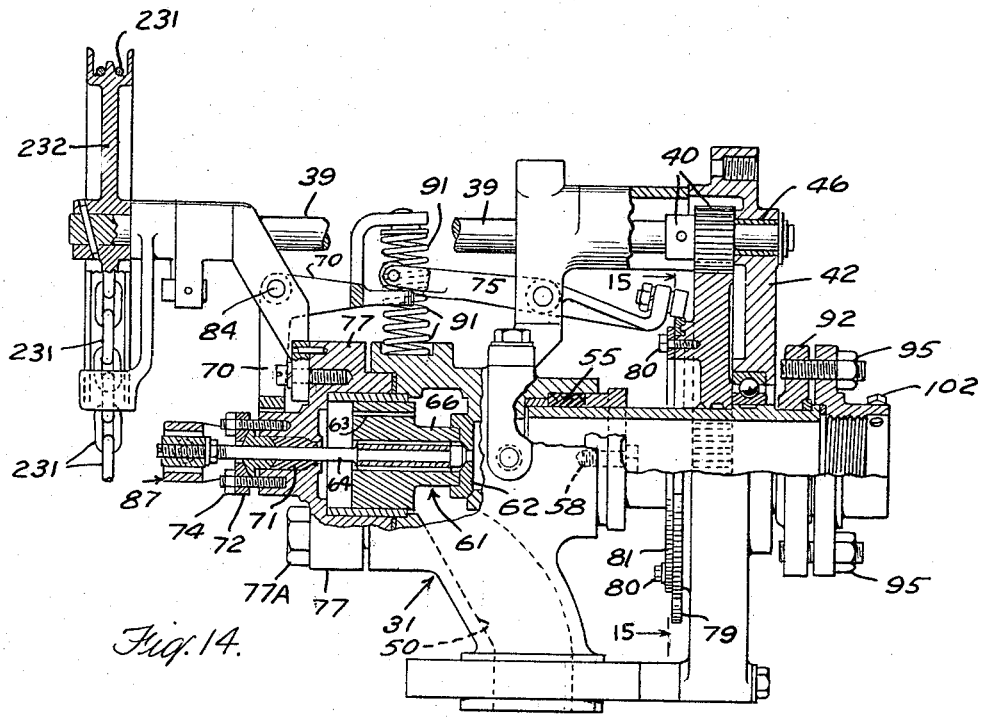

United States Patent Office 3,380,102
Patented Apr. 30, 1968

3,380,102
ROTARY SOOT BLOWER
Burford L. Johnson, East Orange, and Robert P. Gillette, Dover, N.J., assignors to Foster Wheeler Corporation, Livingston, N.J., a corporation of New York
Filed Sept. 30, 1964, Ser. No. 400,533
18 Claims. (Cl. 15—318)

This invention relates to soot blowers and more particularly to rotary soot blowers.

In removing soot from the tubes of steam generators, rotary soot blowers have been available for some time. In this type of apparatus, a rotary element is located permanently within a furnace structure adjacent a group of tubes or tube banks from which the soot is periodically removed by high pressure steam being blown against the tubes from openings in the element. During the operation of the soot blower, the element rotates so as to direct the steam against the tube banks. Such rotary soot blowers are used intermittently during the operation of the steam generator. It is highly advantageous that such a device be started by either a button or a signal from an automatic device and then stopped automatically as the trend is more and more to automated steam power equipment.

In the past, in such soot blower devices, extensive force has been required to open the valve which supplied the steam to the soot blower. The application of such extensive force has required a device with exceptionally heavy parts. Furthermore, in the control system of such a rotary soot blower, be it either pneumatic or electric, it has been highly advantageous to have a dependable control system. Where a series of soot blowers are operated in sequence, the controls must be capable of starting the next soot blower.

Therefore, it is an object of this invention to provide an improved, simple and dependable control system for a rotary soot blower, either pneumatic or electric.

Another object of this invention is to provide a valve for supplying steam to a rotary soot blower, whether electric, pneumatic, or manual, which valve requires only a minimum of force to actuate.

Still another object of this invention is to provide a control system for a rotary soot blower, either electric or pneumatic, which will automatically shut the soot blower off at the conclusion of a predetermined period.

Still a more specific object of this invention is to provide a control system for a rotary soot blower which will automatically reset for the next operation.

Still another specific object of this invention is to provide a control system for pneumatic rotary soot blowers which will automatically start one pneumatic rotary soot blower, while stopping another pneumatic rotary soot blower.

These and other objects of the invention will be more apparent when taken in conjunction with the following drawings in which:

FIGURE 2 is a vertical cross-section taken on line 2—2 of FIG. 1 with the right-hand end broken away and with portions in elevation;

FIGURE 3 is a vertical section on an enlarged scale taken on line 3—3 of FIG. 2 of the pilot valve for the pneumatic rotary soot blower;

FIGURE 4 is a vertical section on an enlarged scale taken on line 4—4 of FIG. 5 showing the controls for the pneumatic rotary soot blower;

FIGURE 5 is a transverse section on line 5—5 of FIG. 4;

FIGURE 6 is an isometric view of the cam and pawl assembly, the bleeder block, and the reset assembly for the pneumatic rotary soot blower;

FIGURE 13 is a plan view with parts broken away and portions of elevation of the manual rotary soot blower;

FIGURE 14 is a vertical section similar to FIG. 9 with parts in elevation of the manual rotary soot blower;

FIGURE 15 is a vertical section of the valve cam taken on line 15—15 of FIG. 14; and FIGURE 16 is a perspective view of the valve cam shown in FIG. 15.

Figure 1:
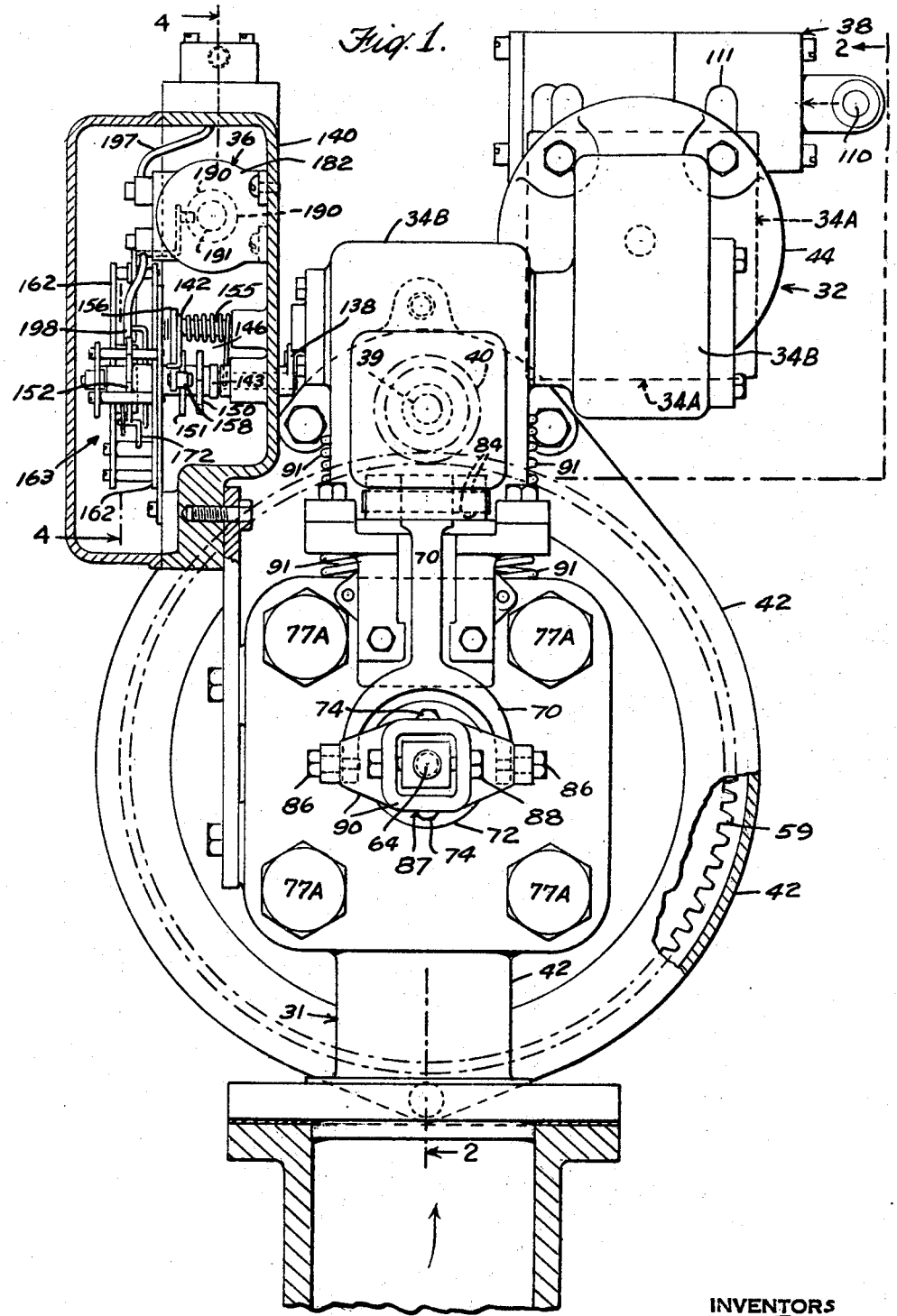
FIGURE 1 is an end elevation with portions shown in cross-section of the pneumatic rotary soot blower.

The objects and advantages of this invention are achievable in both a pneumatic as well as an electrical embodiment. Those objects and advantages not associated with a control system can also be achieved in a manual embodiment.

The electric and pneumatic rotary soot blowers have three main assemblies, namely, a motor and gear reducer assembly, a control system assembly, and a blower head assembly. The manual rotary soot blower substitutes a chain-driver wheel for the pneumatic or electric motor and requires no controls.

The embodiment shown in FIGS. 1 through 7 is the pneumatically operated rotary soot blower. Consistent with the three assemblies previously described, the pneumatic rotary soot blower has a blower head assembly 31, an air motor and gear reducer assembly 32, and a pneumatic control assembly 33. The pneumatic motor and gear reducer assembly 32 is constructed from an air motor 34A and gear reducer 34B. The pneumatic control assembly 33 includes a cam and pawl assembly 35, a delay cylinder assembly 36, a transfer valve assembly 37, and a pilot valve assembly 38.

The pneumatic rotary soot blower will be the first embodiment to be described. The pneumatic blower head assembly 31, which is the first assembly of the pneumatic rotary soot blower to be described, is identical with the electric blower head assembly (FIG. 9) and the manual blower head assembly (FIG. 14). For this reason, all three blower head assemblies 31 will be described together with the description of the pnuematic embodiment.

Referring to FIGS. 1 and 2, rotating motion is supplied through a drive shaft 39. In the pneumatic embodiment, the rotating motion is supplied from an air motor and gear reducer assembly 32. Mounted on the drive shaft 39 is a pinion 40. A housing 42 defines and supports the entire blower head assembly. The drive shaft 39 is connected to the air motor and gear reducer assembly 32 by a coupling 44. The opposite end of the drive shaft 39 is mounted within a journal bearing 46 held within the housing 42. The pinion 40 is secured to the shaft 39 by means of a roll pin 47.

Steam is introduced into the soot blower through a steam inlet 50 and passes through a valve chamber 51 when open to enter into a supply tube 48. A valve plug assembly 61 is located within the valve chamber 51. The supply tube 48 is mounted within the housing 42 by means of a ball bearing 52 and a sleeve bearing 54. A seal is formed between the housing 42 and the rotatable supply tube 48 by means of a chevron packing 55 which is held in place by a supply tube gland 56. The gland 56 is forced against the packing by means of gland bolts 58. A large gear 59 is securely mounted on the supply tube 48. Since the pinion 40 and the large gear 59 intermesh, the large gear 59 is driven by the pinion 40.

At the entrance to the supply tube 48 within the valve chamber 51 is a valve seat 60. The valve plug assembly 61 has as a part thereof a valve plug 62. The valve plug 62 has a seat face 69 and a stem face 73. When the valve plug assembly 61 is in a closed position, the seat face 69 is against the valve seat 60. A bleed passage 63 connects through the valve plug 62. The bleed passage 63 connects the steam inlet 50 with a portion 65 of the valve chamber 51 located behind the valve plug 62. A valve stem 64 is mounted in a sliding relationship in an opening 66 through the valve plug 62. The opening 66 extends through both the seat face 69 and the stem face 73. An inner valve seat 67, against which the valve stem 64 rests, is located in the valve plug 62 at the seat face 69. The opening 66 and valve stem 64 are adapted to permit communication through the opening 66 when the stem 64 is only slightly withdrawn from the inner valve seat 67. This is accomplished by a series of passageways 68 located around the periphery of the valve stem 64. The valve stem 64 extends outwardly beyond the housing 42 where it is connected to a yoke assembly 70. Leakage about the pilot stem is prevented by means of a chevron packing 71. The chevron packing 71 is held in place by means of a cover plate 72 which is secured to the housing 42 by means of bolts 74. A cylinder head 77 can be removed to obtain access to the valve plug assembly 61 by removal of cylinder head bolts 77A.

Figure 7:
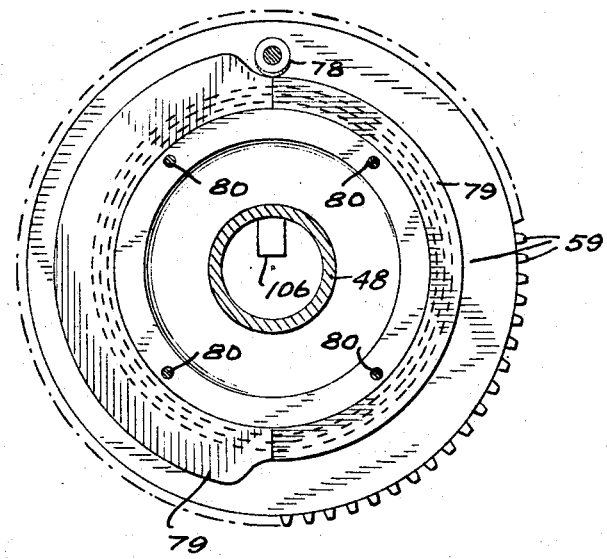
FIGURE 7 is a vertical section of a portion of the apparatus shown in FIGURE 2 taken on line 7—7 of the figure.

A follower arm 75 is pivotably mounted on the housing by means of a shaft 76. At the end of the follower arm 75 is a rotatable wheel 78 which rests against a valve cam 79. The valve cam 79, as best seen in FIG. 7, is secured to the large gear 59 by means of bolts 80 and a retaining ring 81. As shown in FIG. 16, the valve cam 79 is constructed in two sections. A spring 82 forces the follower arm 75 against the valve cam 79. The opposite end of the follower arm 75 also has a rotatable wheel 83 which rests against the yoke assembly 70. The yoke assembly 70 is an L-shaped arm pivotably mounted on a shaft 84 which is supported by the housing 42. As best seen in FIG. 1, an end of the yoke assembly 70 is yoke shaped and is attached by bolts 86 to a bracket 87 which is in turn secured to the end of the valve stem 64 by means of a bolt 88. Two extensions 90, which are a part of the yoke assembly 70, permit two compression springs 91 to force the yoke assembly against the wheel 83 of the follower arm 75.

Attached to the downstream end of the supply passage 48 is a supply passage flange 92. The supply passage flange 92 is secured to the supply tube 48 by means of a key 94. Bolted to the supply passage flange 92 by bolts 95 is an element flange 96. A blower element 98 is secured to the element flange 96 by means of a threaded connection 99 and a lock bolt 102. The blower element 98 extends through a furnace wall 103 by means of an opening 104. Discharge ports 106 are located in the blower element 98 so that steam can be passed from out of the blower element against furnace tubes 107 situated adjacent to the element 98.

When the drive shaft is rotated, the cam 79 causes the rotatable wheel 78 to rise, thereby pivoting the follower arm 75 which depresses the upper end of the yoke assembly 70 which in turn retracts the valve stem 64. Steam from the steam inlet 50 flows through the bleeder passage 63 in the valve plug 62 to the portion 65 of the chamber 51 at the rear of the valve plug 62. When the pilot stem 64 is retracted by the yoke assembly 70, steam from the chamber 64 flows into the element. This flowing of steam causes a pressure drop between the seat face 69 and the stem face 73 of the valve plug 62 which forces the valve plug 62 away from the valve seat 60. Steam then flows directly to the element 98. The valve cam 79 is so adjusted as to cause the follower arm 75 to rise and fall at the proper time to permit the steam to flow through the blower element 98 when the openings 106 of the blower element 98 are in proper relationship to the tubes 107 to remove soot.

The above description specifies the operation of a blower head assembly, be it pneumatic, electric, or manual, once rotary motion is supplied. The following description covers the pneumatic control assembly 33 which operates the start of the air motor and gear reducer assembly 32.

In general, operation of the pneumatic rotary soot blower is started by an air impulse sent to the pilot valve assembly 38 by the pushing of a button (not shown). Since only an impulse is required, the button can be released immediately after depressing it. This results in air being delivered to an air motor 53 which is part of the air motor and gear reducer assembly 32. In this way the large gear 59 and valve cam 79 are rotated which, through the follower arm 75, rotates a cam and pawl assembly 35. At the end of the rotation of the large gear 59, the delay cylinder assembly 36 actuates the transfer valve assembly 37 which sends an impulse to the pilot valve assembly 38 causing the supply of air to the air motor 53 to stop. The delay cylinder 36 then, after a predetermined time delay, resets the cam and pawl assembly 35 for the next operation. Just as the impulse from the push button was used to start the initial pneumatic rotary soot blower, so the impulse from the transfer valve assembly 37 can be applied to the pilot valve assembly 38 of the next soot blower to be operated in sequence to start that pneumatic rotary soot blower while stopping the pneumatic rotary soot blower initially started. In this way, any number of pneumatic rotary soot blowers can be operated in sequence.

The pilot valve assembly 38 which is best shown in detail in FIG. 3 is enclosed within a pilot valve housing 108. At one end is an air inlet connection 110 through which supply air is introduced into the pilot valve 38. On one side is an air outlet connection 111 which supplies air to the air motor 34A and to a feedback inlet 115. On the opposite side is a start signal inlet 112 to which the impulse is supplied to open the pilot valve 38 and to start operation of the air motor 34A. As has already been pointed out, this starting impulse can be from a manually operated valve (not shown) or from the transfer valve assembly of another pneumatic rotary soot blower. A trip signal inlet 114 to the pilot valve 38 is used to introduce a signal from the transfer valve assembly 37 which closes the pilot valve 38 at the conclusion of the operation. A vent 116 discharges to the atmosphere the air in the pilot valve 38 which has been supplied through the signal inlet 114. The size of the vent 116 controls the period of time required to discharge the air and a sufficient delay is essential so that the air introduced through the signal inlet 114 has sufficient time to act.

Within the pilot valve housing 108 is a hollow chamber 118. Intermediate within the valve chamber 118 is a baffle 123 which blocks the passage of air from the air inlet 110 to all outlets and inlets except the motor supply outlet 111. A valve stem 122 is guided and slidably fitted through the baffle 123. Located at one end of the valve stem 122, is a valve plug 120. The stem 122 and the plug 120 are formed from an integral part. To prevent leakage in the passageway for the valve stem 122 through the baffle 123, an O-ring 124 is provided. A disc 126 is secured to the end of the valve stem 122. Between the disc 126 and the baffle 123, a spring 127 is located which forces the valve stem 122 downwardly, thereby causing the valve plug 120 to seat against a valve seat 119. A piston 128 is slidably fitted in the chamber 118 so that it is above the start signal inlet 112 and feedback inlet 115, but is below the trip signal inlet 114 and is adjacent to the end of the valve stem 122. An O-ring 130 prevents leakage around the piston 128.

When an air impulse is introduced through the start signal inlet 112 as has been previously explained, the piston 128 is thereby forced upwardly and against the end of the valve stem 122. This lifts the valve plug 120 off the valve seat 119 allowing compressed air to flow through the air supply inlet 110 and down to the baffle 123 and outwardly from the outlet 111. At the conclusion of the operation, a signal is received from the transfer valve 37 which is introduced through the signal inlet 114 forcing the piston 128 downwardly. The force of the spring 127 causes the valve stem 122 to move downwardly and seat the valve plug 120 against the valve seat 119 which shuts off the source of supply air and discontinues the operation of the air motor 53.

The cam and pawl assembly 35 best shown in FIG. 6 is operated from the follower arm 75. Referring to FIG. 6, it is noted that the follower arm 75 with the rotatable wheel 78 is shown. The wheel 78 rides on the cam 79 as has been previously explained. When the rise of the cam 79 forces the wheel 78 upwardly, tilting the follower arm 75, steam is released through the blower element 98. Connected to the follower arm 75 is an actuating bracket 131. The actuating bracket is secured to the follower arm 75 by means of screws 132. A connecting link 134 is rotatably mounted at one end to the actuating bracket 131 by means of a pin 135. The other end of the connecting link 134 is rigidly secured to a rod 136 which is rotatably secured to an arm 138. A shaft 139 which passes through the cam and pawl enclosure 140 is rigidly connected at one end to the arm 138 so as to be rotated by movement of the follower arm 75. Rigidly mounted at the other end of the shaft 139 is a pawl assembly 142. The pawl assembly 142 includes an extension 143, a rod 144, and a pawl arm 146 which is spring loaded by means of a spring 147. Extending longitudinally from the shaft 139 is a sleeve 148 which rotates independently of the pawl assembly 142 and the shaft 139. Mounted on a sleeve 148 are three cams, namely, a pawl cam 150, a limiting cam 151, and a bell crank cam 152 which form a cam assembly 153. All three cams 150, 151, and 152 are rigidly mounted on the sleeve 148. The pawl assembly 142 rides up onto the pawl cam 150 when the shaft 139 is rotated by the follower arm 75 acting through the actuating bracket 131, the connecting link 134, and the rod 136. The pawl arm 146 of the pawl assembly 142 then drops into the next cam recess 145 to rotate all the cams on the shaft 148 when the follower arm 75 drops off the cam 79.

Working in conjunction with the limiting cam 151 is a detent assembly 154. The detent assembly 154 includes a rod 155 securely mounted to the side of the pawl and cam enclosure 150. Rotatably mounted on the rod 155 is an extension arm 156 having a wheel 158 secured to the opposite end. The arm 156 is spring-loaded by a spring 159 so that the wheel 158 is forced against a notch 160 in the limiting cam 151. The cam 151 actually has four notches 160 at precisely ninety-degree intervals. The spring-loaded wheel 158 engages in sequence the notches 160 upon rotation of the limiting cam 151 to assure that the cam assembly 153 advances only ninety degrees with each movement.

Located adjacent the bell crank cam 152 and operating in conjunction with it is a reset assembly 163 which is mounted on a plate 162. Within the reset assembly 163 is a delay link 164 rotatably mounted on a shaft 166. Also within the reset assembly 163 is a toggle link 167 rotatably mounted on a shaft 168 and loaded by a spring 170. One end of the spring 170 is about the toggle link 167 while the other end is supported by a peg 171. Rotatably mounted at the end of the toggle link 167 is a shunt-off link 172 which is held in place by a shut-off link spring 173 which is connected at one end to an opening in the shut-off link 172 and at the other to a peg 174. The shut-off link 172 is rotatably mounted on the toggle link 167 by means of a shaft 175. Operatively associated between the shut-off link 172 and the bell-crank cam 152 is a bell crank 176 which is mounted on a shaft 177 and forced against the bell crank cam 152 by a spring 178.

The bell crank cam 152 has four notches 179 into one of which the bell crank 176 drops for a triggered position. When the cam assembly 153 is rotated by operation of the follower arm 75, the bell crank 176 rides up onto the uncut portion of the bell crank cam 152 to clear the shut-off link 172. The bell crank 176 then drops into the next notch 179 thereby striking the shut-off link 172 and forcing it upwardly against a bleed nozzle block 180. Air bleeds from the delay cylinder assembly 36 through the bleed nozzle block 180 where an orifice opening 181 permits the escape of the air. When the shut-off link 172 presses against the orifice 181, discharge of the air from the delay cylinder assembly 36 is stopped. Pressure then builds up within the delay cylinder 36. Through subsequent action of the transfer valve assembly 37, supply air is admitted to the signal inlet 114 of the pilot valve assembly 38 thereby closing the pilot assembly 38 and stopping the flow of supply air to the air motor and gear reducer assembly 32.

As best seen in FIG. 4, the delay assembly 36 is enclosed within a delay cylinder housing 182. Within the delay cylinder housing 182 is a piston 184 sealed against the inside of the delay cylinder housing 182 by means of an O-ring 185. The piston 184 is forced towards the rear portion 187 of the housing 182 by means of a spring 188. Connected to the piston 184 is a hollow rod 190. The rod 190 extends longitudinally of the cylindrical housing 182. Within the hollow rod 190 is an inner rod 191 which is forced forward in the hollow rod 190 by means of a spring 193. Slots 194 are located in the hollow rod 190, along which guide pin 195 slides. The guide pin 195 is rigidly secured to the inner rod 191. Air is supplied through an orifice 196 in a tube 197 and into the rear portion of the cylinder housing 182 behind the piston 184. The opening through the orifice 196 preferably has a diameter of 0.009 inch. Air exits from the housing 182 through the tube 198 and through the bleed nozzle orifice 181 to the atmosphere. When the shut-off link 172 closes the opening 181, pressure builds up in back of the piston 184 forcing it forward. The rod 191 then contacts a stem 199 of the transfer valve assembly 37. The end of the hollow rod 190 subsequently, after a delay of a predetermined period of time, contacts the delay link 164. This is caused by the continued movement of the piston 184, since the air pressure behind the piston 184 continues to build up even after the transfer valve 37 is actuated. This time delay between the contacting of the stem 199 and the delay link 164 is required to allow the piston in the pilot valve assembly 38 to reset and shut off the air flow to the motor assembly 32 before the shut-off link 172 is removed from the bleed nozzle opening 181. The piston 184 and hollow rod 190 are allowed therefore to move further under the pneumatic pressure until the hollow rod 190 contacts the delay link 164 which causes the reset assembly 163 to remove the shut-off link 172 from the orifice 181. When the delay link 164 is pivoted by the ejection of the hollow rod 190, it contacts the toggle link 167 which pivots and moves the shut-off link 172 away from the orifice 181. In this way, the shut-off link 172 clears the top of the bell crank 176. The other end of the bell crank 176 is forced by the bell crank spring 177 against the bell crank cam 152.

When the follower arm 75 drops, rotation of the bell crank cam 172 results which causes the bell crank 176 to force the shut-off link 172 against the orifice 181. This causes pressure to build up within the delay cylinder assembly 36 forcing the inner rod 191 against the stem 199 of the transfer valve 37 which in turn shuts off the air motor 53. Following the predetermined time delay following the stopping of the air motor 53, the hollow rod 190 moves the delay assembly 163 which removes the shut-off link 172 from the opening 181 to reset the delay assembly 163 for operation the next time the soot blower is started.

The transfer valve assembly 37 which is best seen in FIG. 4 is attached to the pawl and cam enclosure 140. The stem 199 of the assembly 37 projects into the enclosure 140 so as to be readily contacted after approximately 1/16 inch travel by the inner rod 191 when the piston 184 is forced against the rear wall 187 of the delay cylinder housing 182. A transfer valve housing 201 completely encloses the transfer valve assembly 37. Compressed air is supplied into the transfer valve assembly 37 through an air supply inlet 202. A pilot valve outlet 203 connects the transfer valve 37 with the trip signal inlet 114 of the pilot valve assembly 38. Mounted on the valve stem 199 is a valve plug 205 which seats against the valve seat 206 to shut off the flow between the inlet 202 and the outlet 203. A spring 207 forces the valve plug 205 against the valve seat 206. When the inner rod 191 of the delay cylinder assembly 36 strikes the stem 199, the valve plug 205 is moved backward away from the valve seat 206 in opposition to the spring 207 permitting air to flow from the inlet 202 through the outlet 203. Once the outer or hollow rod 190 operates the delay assembly 163 to reopen the bleed nozzle opening 181, the delay cylinder assembly 36 retracts permitting the valve plug 205 to close against the valve seat 206 shutting off the air flow.

Figure 9:
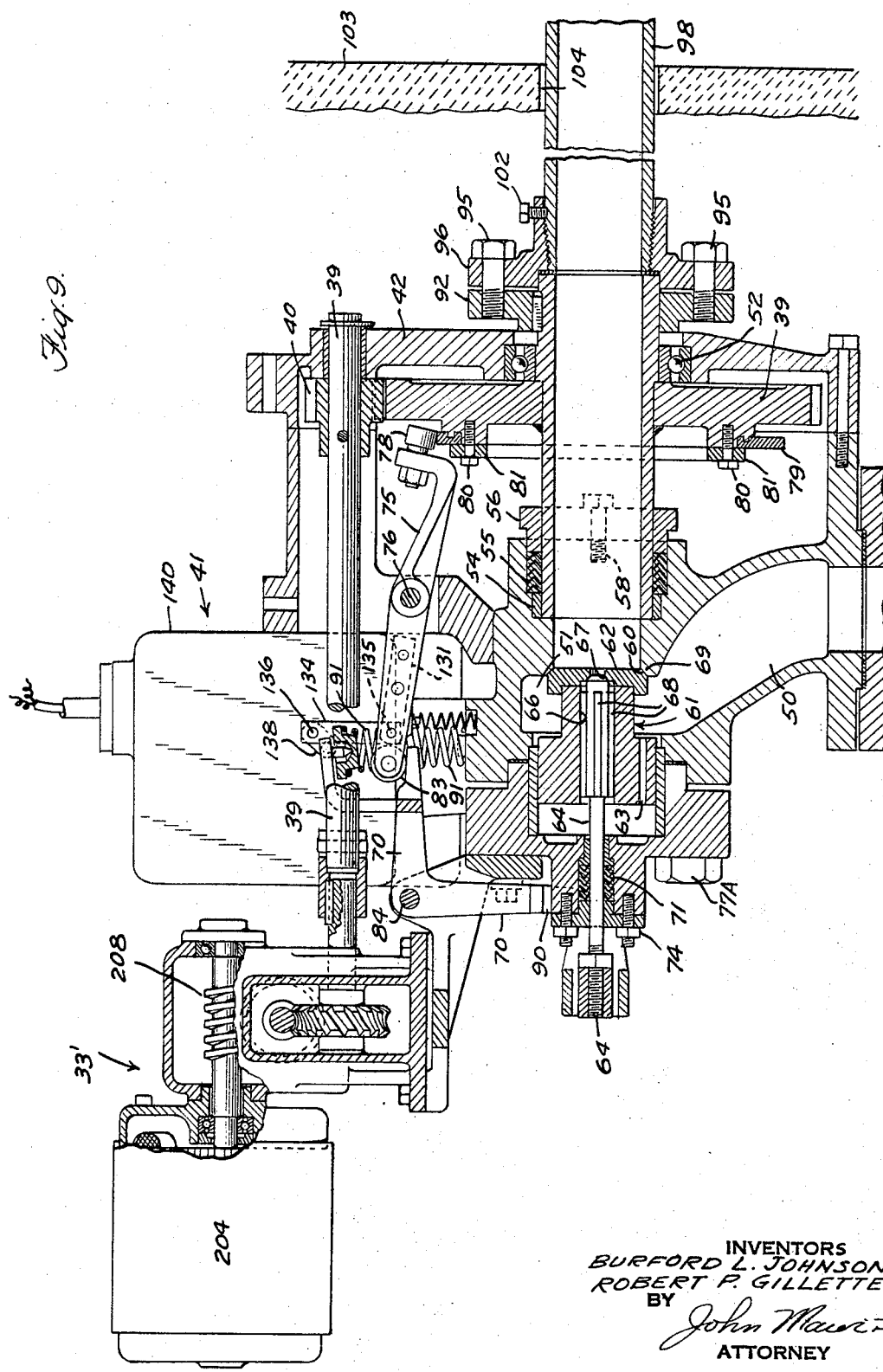
FIGURE 9 is a vertical cross-section similar to FIG. 2 of the electric rotary soot blower.
Figure 10:
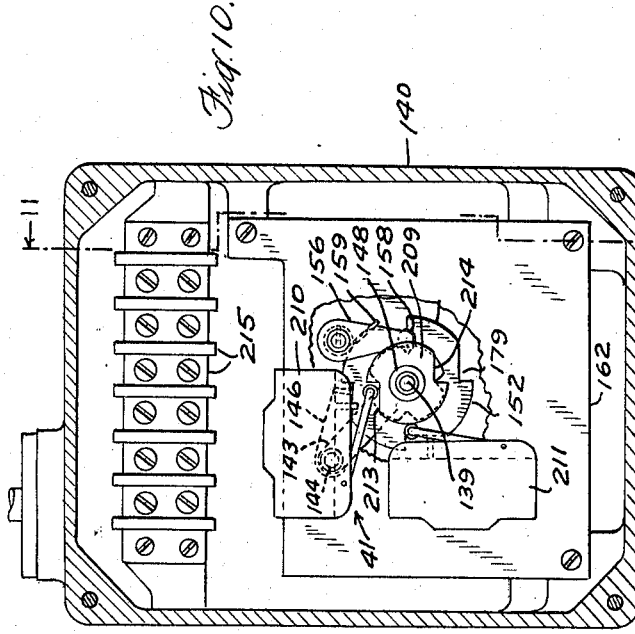
FIGURE 10 is a vertical sectional view taken on line 10—10 of FIG. 11 showing the controls for the electric rotary soot blower.
Figure 11:
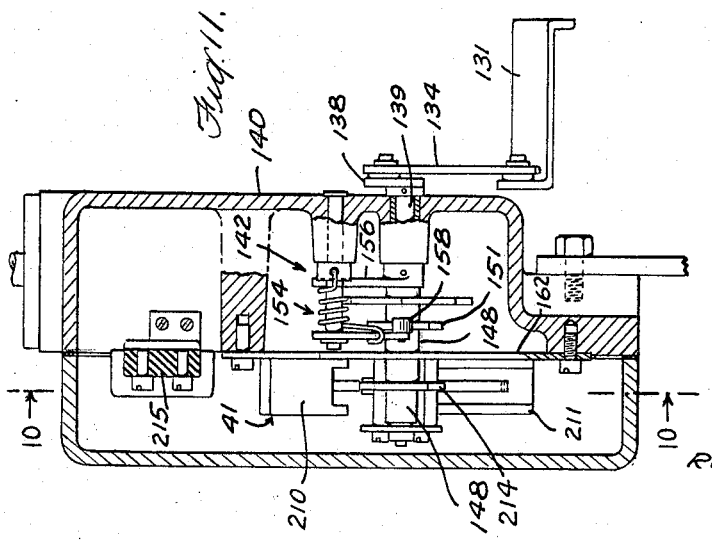
FIGURE 11 is a transverse vertical section taken on line 11—11 of FIG. 10.

The electric rotary soot blower, best shown in FIG. 9 is similar to the pneumatic rotary soot blower except that the air motor and gear reducer assembly 32 of the pneumatic system is replaced with the electric motor and gear reducer assembly 33 which has an electric motor 204 and a gear reducer 208. Also, the pneumatic control system 33 is replaced with an electric control assembly 41. Within the electric control assembly 41, as best seen in FIGS. 10 and 11, many of the parts previously described for the pneumatic control system 34 remain the same. For example, the connection of the actuating bracket 131 to the follower arm 75 remains the same along with the connecting rod 136, the arm 138, and the shaft 139, the enclosure 140 and the pawl assembly 142 interacting with the pawl cam 150. Likewise, the shaft 148 remains unchanged as does the detent assembly 154 and the limiting cam 151. A difference occurs in that the bell crank cam 152 is replaced with a switch cam 209 and the entire reset assembly 163, delay cylinder assembly 36, transfer valve 37, and pilot valve assembly 38 are deleted.

Figure 8:
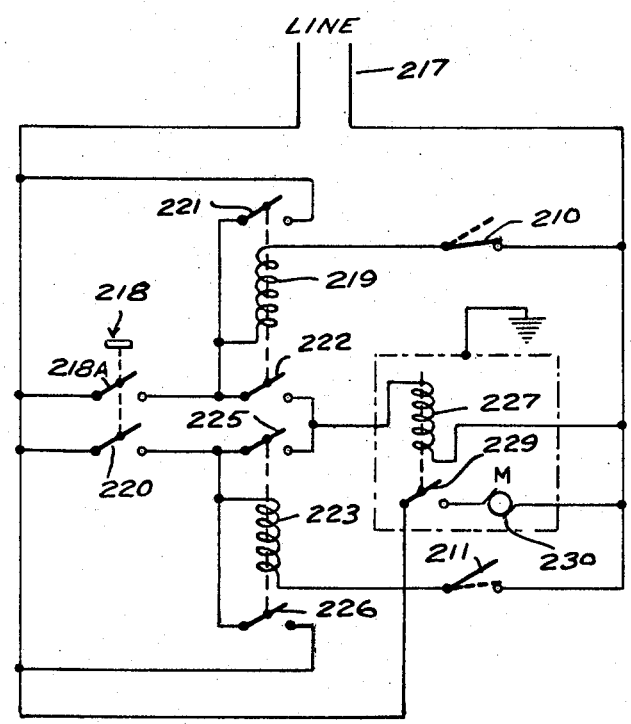
FIGURE 8 is a schematic wiring diagram of the control circuitry for control of the electric rotary soot blower.
Figure 12:
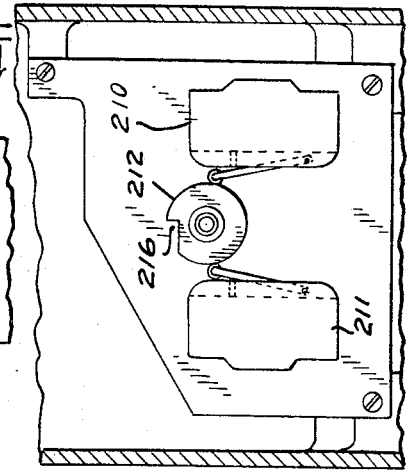
FIGURE 12 is a transverse vertical section of a modified form of controls for the electric rotary soot blower.

As best seen in FIG. 12, in place of the reset assembly 163, two microswitches, 210, and 211, are located. The switch cam 209 has two notches located therein, 213, and 214. Within the enclosure 140 is located a terminal board 215. Operation of the electrical control system can best be understood by referring to the wiring diagram shown in FIG. 8. Electric current is supplied to the system from a source 217. The system is actuated by the operator depressing a push button 218 which automatically releases when the operator takes his hand from it. At the beginning of each operation, one microswitch is open and the other is closed. As shown in FIGS. 8 and 11, the microswitch 210 is closed and the microswitch 211 is open. When the operator depresses the push button 218 current flows through the relay switch 218A, which in turn closes the relay switch contacts 221, 222. It should be noted that current does not flow through the relay coil 223 and therefore does not close the switches 225, 226 because the microswitch 211 is open. At this point, the operator has already released the push button 218 and current is flowing through the contact 221 and 222 and back through the coil 219 maintaining the contacts 221 and 222 in a closed position. This also permits current to flow through the switch 222 and through the coil 227, thereby closing the contact 229 to permit current to flow through the motor 230. At the end of the blowing cycle, the microswitch 211 closes by its lever climbing onto the uncut portion of the cam 209, thereby resetting the system for the next cycle. Following the closing of the microswitch 211, the microswitch 210 opens by its lever, dropping into the next notch of the microswitch cam 209 thereby stopping the electric motor 204. It should be noted that the normally open contact of the one microswitch closes before that of the other microswitch opens. The closing of the second switch does not energize the associated control relay because the circuit remains open until the operator closes the switch 218. During the operation following the one just previously described, the current including the microswitch 211 will be used instead of the microswitch 210, but the general sequence of the operation in all other respects will remain identical, utilizing the relay 220 in place of the relay 219.

In FIG. 12, a modified form of the switch cam is shown. In place of the switch cam 209, a switch cam 212 with only one notch 216 is located. This modified form is preferred when two rotations of the valve cam 79 rotates the notch 216 one-half of a complete turn.

As has been previously pointed out, operation of the manual soot blower is similar except that the operation is purely dependent upon the operator pulling on a chain 231. The chain 231 rotates a drive wheel 232 which is secured to the drive shaft 39. Upon each full rotation of the cam 79, during which cycle the valve plug assembly 61 is opened and closed as has been previously described, the operator stops the motion of the chain 231 until the next operation is needed. Since there is no control system and motor required in the manual rotary soot blower, the prior description of the steam head, in conjunction with the description of the chain 231 and drive wheel 232, fully describes the operation of the manual rotary soot blower.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A soot blower comprising:
    a housing defining an inlet passageway with an inner end and an outer end and defining a valve chamber with a valve seat therein located in communication with the inner end of said inlet passageway and further defining an outlet from said valve chamber;
    a rotatable supply tube rotatably mounted at the outlet of said valve chamber and in communication therewith;
    a valve plug having a seat face and a stem face slidably fitted within said valve chamber and adapted to press said seat face against said valve seat and to slide away from said valve seat, said valve plug having an opening therein extending from said stem face to said seat face with an inner valve seat located therein at said seat face and said valve plug having a bleeder passage therein extending from said stem face to a point on said valve plug continuously in communication with said inlet passageway;
    a valve stem slidably fitted through said opening in said valve plug and adapted to seat at one end against said inner face seat with the opposite end extending through said housing, said valve stem and said opening being jointly adapted to permit communication through said valve plug when said valve stem is only slightly withdrawn from said inner valve seat;
    a drive shaft rotatably mounted on said housing;
    a pinion rigidly secured to said drive shaft;
    a gear rigidly secured to said rotatable supply tube, said pinion and said gear being operatively associated with one another;
    a gear reducer coupled to said drive shaft;

a pneumatic motor for supplying rotating motion to said gear reducer;

means for connecting said pneumatic motor to said drive shaft;

a valve cam mounted on said gear so as to rotate as said gear rotates, said valve cam having a rise and a fall in its periphery;

a valve cam follower assembly means pivotably mounted on said housing, said valve cam follower assembly means being associated at one end with said valve cam, a yoke assembly means pivotably mounted and secured at one end to said valve stem while operatively associated at the other end with said valve cam follower assembly means;

a pilot valve assembly means pneumatically connected to said pneumatic motor for starting and stopping said pneumatic motor, said pilot valve assembly means being adapted to be opened by a starting pneumatic signal for starting said pneumatic motor and to be closed by a stopping pneumatic signal for stopping said pneumatic motor;

means for applying the starting pneumatic signal to said pilot valve assembly means to open said pilot valve assembly means;

a transfer valve pneumatically connected to said pilot valve assembly means for applying the stopping pneumatic signal to said pilot valve assembly means to close said pilot valve assembly means, said transfer valve having an operating stem extending outwardly from said transfer valve which opens said transfer valve to apply the stopping pneumatic signal to the pilot valve assembly means when depressed;

a delay assembly means including a pneumatically operated piston adapted to depress said operating stem of said transfer valve; and means operatively associated with said valve cam follower assembly means for actuating said delay assembly means.

2. A soot blower comprising:

a housing defining an inlet passageway with an inner end and an outer end and defining a valve chamber with a valve seat therein located in communication with the inner end of said inlet passageway and further defining an outlet from said valve chamber;

a rotatable supply tube rotatably mounted at the outlet of said valve chamber and in communication therewith;

a valve plug having a seat face and a stem face slidably fitted within said valve chamber and adapted to press said seat face against said valve seat and to slide away from said valve seat, said valve plug having an opening therein extending from said stem face to said seat face with an inner valve seat located therein at said seat face and said valve plug having a bleeder passage therein extending from said stem face to a point on said valve plug continuously in communication with said inlet passageway;

a valve stem slidably fitted through said opening in said valve plug and adapted to seat at one end against said inner face seat with the opposite end extending through said housing, said valve stem and said opening being jointly adapted to permit communication through said valve plug when said valve stem is only slightly withdrawn from said inner valve seat;

a drive shaft rotatably mounted on said housing;

a pinion rigidly secured to said drive shaft;

a gear rigidly secured to said rotatable supply tube, said pinion and said gear being operatively associated with one another;

a gear reducer coupled to said drive shaft;

a pneumatic motor for supplying rotating motion to said gear reducer;

means for connecting said pneumatic motor to said drive shaft;

a valve cam mounted on said gear so as to rotate as said gear rotates, said valve cam having a rise and a fall on its periphery;

a valve cam follower assembly means pivotably mounted on said housing, said valve cam follower assembly means being associated at one end with said valve cam;

a yoke assembly means pivotably mounted and secured at one end to said valve stem while operatively associated at the other end with said valve cam follower assembly means;

a pilot valve assembly means pneumatically connected to said pneumatic motor for starting and stopping said pneumatic motor, said pilot valve assembly means being adapted to be opened by a starting pneumatic signal for starting said pneumatic motor and to be closed by a stopping pneumatic signal for stopping said pneumatic motor;

means for applying the starting pneumatic signal to said pilot valve assembly means to open said pilot valve assembly means;

a transfer valve pneumatically connected to said pilot valve assembly means for applying the stopping pneumatic signal to said pilot valve assembly means to close said pilot valve assembly means, said transfer valve having an operating stem extending outwardly from said transfer valve which opens said transfer valve to apply the stopping pneumatic signal to the pilot valve assembly means when depressed;

a delay assembly means including a piston slidably fitted within a cylinder and a rod assembly extending from said piston, said cylinder having an inlet behind said piston and an outlet behind said piston, said operating stem of said transfer valve and said rod assembly of said delay assembly means being located on a common longitudinal axis and adjacent one another in a closely spaced relationship; and means operatively associated with said valve cam follower assembly means for actuating said delay assembly means.

3. A soot blower comprising:

a housing defining an inlet passageway with an inner end and an outer end and defining a valve chamber with a valve seat therein located in communication with the inner end of said inlet passageway and further defining an outlet from said valve chamber;

a rotatable supply tube rotatably mounted at the outlet of said valve chamber and in communication therewith;

a valve plug having a seat face and a stem face slidably fitted within said valve chamber and adapted to press said seat face against said valve seat and to slide away from said valve seat, said valve plug having an opening therein extending from said stem face to said seat face with an inner valve seat located therein at said seat face and said valve plug having a bleeder passage therein extending from said stem face to a point on said valve plug continuously in communication with said inlet passageway;

a valve stem slidably fitted through said opening in said valve plug and adapted to seat at one end against said inner face seat with the opposite end extending through said housing, said valve stem and said opening being jointly adapted to permit communication through said valve plug when said valve stem is only slightly withdrawn from said inner valve seat;

a drive shaft rotatably mounted on said housing;

a pinion rigidly secured to said drive shaft;

a gear rigidly secured to said rotatable supply tube, said pinion and said gear being operatively associated with one another;

a gear reducer coupled to said drive shaft;

a pneumatic motor for supplying rotating motion to said gear reducer;

means for connecting said pneumatic motor to said drive shaft;

a valve cam mounted on said gear so as to rotate as said gear rotates, said valve cam having a rise and a fall in its periphery;

a valve cam follower assembly means pivotably mounted on said housing, said valve cam follower assembly means being associated at one end with said valve cam;

a yoke assembly means pivotably mounted and secured at one end to said valve stem while operatively associated at the other end with said valve cam follower assembly means;

a pilot valve assembly means pneumatically connected to said pneumatic motor for starting and stopping said pneumatic motor, said pilot valve assembly means being adapted to be opened by a starting pneumatic signal for starting said pneumatic motor and to be closed by a stopping pneumatic signal for stopping said pneumatic motor;

means for applying the starting pneumatic signal to said pilot valve assembly means to open said pilot valve assembly means;

a delay assembly means including a piston slidably fitted within a cylinder and a rod assembly means secured to said piston, said cylinder having an inlet for supplying air behind said piston and an outlet for discharging the air from behind said piston as quickly as it is supplied, said delay assembly means further including a spring for retaining said piston in a retracted position in the absence of air pressure behind said piston;

a bleeder block having a passageway therethrough with an inlet and an outlet, said inlet to said bleeder block being connected to the outlet of said delay assembly means, said outlet being in the form of an aperture for discharging the air from said delay assembly means;

a shut-off link with a flat surface area pivotably mounted adjacent said bleeder block and adapted to pivot said flat surface area against said aperture in said bleeder block to prevent the flow of air through said aperture;

a pivotably mounted bell crank adapted to engage said shut-off link to pivot said shut-off link against said aperture of said bleeder block;

a bell crank cam operatively associated with said bell crank to pivot said bell crank, said bell crank cam having at least one notch located on its periphery adapted to engage the end of said bell crank moving it downwardly to raise the opposite end upwardly against the shut-off link to press the shut-off link against the aperture;

a cam and pawl shaft rotatably supported and having the bell crank cam rigidly mounted thereon;

a pawl cam rigidly mounted on said pawl and cam shaft, said pawl cam having notches on its periphery;

a pawl operatively associated with said pawl cam for rotating said pawl cam;

means for connecting said pawl to said valve cam follower assembly means and adapted so that as said valve cam follower means rides up on said valve cam said pawl climbs onto the pawl cam engaging the pawl cam at a notch and as said valve cam follower drops down on said valve cam said pawl pushes said pawl cam causing it to rotate; and a transfer valve pneumatically connected to said pilot valve for applying the stopping pneumatic signal to said pilot valve assembly means to close said pilot valve assembly means, said transfer valve having an operating stem extending outwardly from said transfer valve which opens said transfer valve to apply the stopping pneumatic signal when depressed, said operating stem of said transfer valve and said rod assembly means being located on a common longitudinal axis and adjacent one another in a closely spaced relationship.

4. A soot blower comprising:

a housing defining an inlet passageway with an inner end and an outer end and defining a valve chamber with a valve seat therein located in communication with the inner end of said inlet passageway and further defining an outlet from said valve chamber;

a rotatable supply tube rotatably mounted at the outlet of said valve chamber and in communication therewith;

a valve plug assembly means slidably fitted within said valve chamber and adapted to press against said valve seat to block said outlet from said valve chamber and slide away from said valve seat to open said outlet, said valve plug assembly means including a valve stem which extends outside said housing;

a drive shaft rotatably mounted on said housing;

a pinion rigidly secured to said drive shaft;

a gear rigidly secured to said rotatable supply tube, said pinion and said gear being operatively associated with one another;

a pneumatic motor;

means for connecting said pneumatic motor to said drive shaft to rotate said drive shaft;

a valve cam mounted on said gear so as to rotate as said gear rotates, said valve cam having a rise and a fall on its periphery;

a valve cam follower assembly means pivotably mounted on said housing, said valve cam follower assembly means being in operative association at one end with the periphery of said valve cam;

a yoke assembly means pivotably mounted on said housing and secured at one end to said valve stem while operatively associated at the other end with said valve cam follower assembly means;

a pilot valve assembly means pneumatically connected to said pneumatic motor for starting and stopping said pneumatic motor, said pilot valve assembly means being adapted to be actuated for both starting and stopping by separate pneumatic signals;

means for applying a pneumatic signal to said pilot valve assembly means to start the pneumatic motor;

a transfer valve connected to said pilot valve for applying a pneumatic signal to said pilot valve to stop the pneumatic motor, said transfer valve having an operating stem extending outwardly from said transfer valve which opens said transfer valve to apply the pneumatic signal to stop the pneumatic motor when depressed;

a delay assembly means including a pneumatically operated piston for actuating said operating stem of said transfer valve; and means operatively associated with said valve cam follower assembly means for actuating said delay assembly means.

5. A soot blower comprising:

a housing defining an inlet passageway with an inner end and an outer end and defining a valve chamber with a valve seat therein located in communication with the inner end of said inlet passageway and further defining an outlet from said valve chamber;

a rotatable supply tube rotatably mounted at the outlet of said valve chamber and in communication therewith;

a valve plug assembly means slidably fitted within said valve chamber and adapted to press against said valve seat to block said outlet from said valve chamber and slide away from said valve seat to open said outlet, said valve plug assembly means including a valve stem which extends outside said housing;

a drive shaft rotatably mounted on said housing;

a pinion rigidly secured to said drive shaft;

a gear rigidly secured to said rotatable supply tube, said pinion and said gear being operatively associated with one another;

a pneumatic motor;

means for connecting said pneumatic motor to said drive shaft to rotate said drive shaft;

a valve cam mounted on said gear so as to rotate as said gear rotates, said valve cam having a rise and a fall on its periphery;

a valve cam follower assembly means pivotably mounted on said housing, said valve cam follower assembly means being in operative association at one end with the periphery of said valve cam;

a yoke assembly means pivotably mounted on said housing and connected at one end to said valve stem while operatively associated at the other end with said valve cam follower assembly means;

a delay assembly means including a piston slidably fitted within a cylinder and a rod assembly secured to said piston, said cylinder having an inlet for supplying air behind said piston and an outlet for discharging the air from behind said piston, said delay assembly means further including a spring for retaining said piston in a retracted position in the absence of air pressure behind said piston;

a bleeder block having a passageway therethrough with an inlet and an outlet, said inlet to said bleeder block being connected to said outlet of said delay assembly means, said outlet from said bleeder block being in the form of an aperture for discharging the air from said delay assembly means;

a shut-off link with a flat surface area pivotably mounted adjacent said bleeder block and adapted to pivot said flat surface area against said aperture in said bleeder block to prevent the flow of air through said aperture;

a pivotably mounted bell crank adapted to engage said shut-off link to pivot said shut-off link against said aperture of said bleeder block;

a bell crank cam operatively associated with said bell crank to pivot said bell crank, said bell crank cam having at least one notch on its periphery adapted to engage the end of said bell crank moving it downwardly to raise the opposite end upwardly against the shut-off link to press the shut-off link against the aperture;

a cam and pawl shaft rotatably supported and having the bell crank cam rigidly mounted thereon;

a pawl cam rigidly mounted on said pawl and cam shaft, said pawl cam having notches on its periphery;

a pawl operatively associated with said pawl cam for rotating said pawl cam;

means for connecting said pawl to said valve cam follower assembly means and adapted so that as said valve cam follower assembly means rides up on said valve cam said pawl climbs onto the pawl cam engaging the pawl cam at a notch and as said valve cam follower drops down on said valve cam said pawl pushes said pawl cam causing it to rotate thereby moving said shut-off link against said aperture on said bleeder block causing said piston of said delay assembly to force the rod assembly outwardly; and a transfer valve pneumatically connected to said pilot valve for applying the stopping pneumatic signal to said pilot valve assembly means to close said pilot valve assembly means, said transfer valve having an operating stem extending outwardly from said transfer valve which opens said transfer valve to apply the stopping pneumatic signal when depressed, said operating stem of said transfer valve and said rod assembly being located on a common longitudinal axis whereby the operating stem is depressed when said piston of said delay assembly forces the rod assembly outwardly.

6. A soot blower comprising:

a housing defining an inlet passageway with an inner end and an outer end and defining a valve chamber with a valve seat therein located in communication with the inner end of said inlet passageway and further defining an outlet from said valve chamber;

a rotatable supply tube rotatably mounted at the outlet of said valve chamber and in communication therewith;

a valve plug having a seat face and a stem face slidably fitted within said valve chamber and adapted to press said seat face against said valve seat, said valve plug having an opening therein extending from said stem face to said seat face and with an inner valve seat within said opening located at said seat face and said valve plug having a bleeder passage therein extending from said stem face to a point on said valve plug continuously in communication with said inlet passageway;

a valve stem slidably fitted through said opening in said valve plug and adapted to seat at one end against said inner seat with the opposite end extending through said housing, said valve stem and opening being jointly adapted to permit communication through said valve plug when said valve stem is only slightly withdrawn from said inner valve seat;

a drive shaft rotatably mounted on said housing;

a pinion rigidly secured to said drive shaft;

a gear rigidly secured to said rotatable supply tube, said pinion and said gear being operatively associated with one another;

means for supplying rotating motion to said drive shaft;

a valve cam fixedly mounted on said gear so as to rotate as said gear rotates, said valve cam having a periphery with a rise and fall therein;

a valve cam follower means in the form of a relatively straight member pivotably mounted on said housing, said cam follower assembly means having a valve cam wheel at one end and a yoke wheel at the other end, said valve cam wheel being associated with the periphery of said valve cam;

a yoke assembly means in the form of an L-shaped member pivotably mounted on said housing and connected at one end to said valve stem while pressing at the other end against said yoke wheel on said valve cam follower means, said yoke assembly means having a plurality of extensions connected to it; and spring means located between said housing and said plurality of extensions to force said yoke assembly means upward against said valve cam follower arm means and said valve cam follower arm means against said valve cam.

7. A soot blower according to claim 6 wherein said means for supplying rotating motion to said drive shaft is a wheel and chain.

8. A soot blower according to claim 6 wherein said means for supplying rotating motion to said drive shaft includes an electric motor and further comprising means for starting and automatically stopping said electric motor.

9. A soot blower according to claim 8 wherein the means for starting and automatically stopping said electric motor includes:

an electrical circuit for operating said electric motor, said circuit including a starting switch for starting said electric motor and a stopping switch for stopping said electric motor;

a switch cam in mechanical contact with said stopping switch, said switch cam having at least one point on its periphery which permits said stopping switch to open when said point is in contact with said switch; and means adapted to rotate said cam so that said point on the periphery of said cam is in contact with said switch thereby opening said switch.

10. A soot blower according to claim 8 wherein the means for starting and automatically stopping said electric motor includes:
an electrical circuit for operating said electric motor, said circuit including a starting switch for starting said electric motor and a stopping switch for stopping said electric motor.

11. A soot blower comprising:
a housing defining an inlet passageway with an inner end and an outer end and defining a valve chamber with a valve seat therein located in communication with the inner end of said inlet passageway and further defining an outlet from said valve chamber;
a rotatable supply tube rotatably mounted at the outlet of said valve chamber and in communication therewith;
a valve plug assembly means slidably fitted within said valve chamber and adapted to press against said valve seat to close said outlet from said valve chamber and slide away from said valve seat to open said outlet, said valve plug assembly means including a valve stem which extends outside said housing;
means including a pneumatic motor for supplying rotating motion to said rotatable supply tube;
means associated with said means for applying rotating motion and operatively connected to said valve stem for operating said valve plug assembly means;
a pilot valve assembly means pneumatically connected to said pneumatic motor for starting and stopping said pneumatic motor, said pilot valve assembly means being adapted to be opened by a starting pneumatic signal for starting said pneumatic motor and to be retained opened by a feedback signal passing through said pilot valve assembly means and to be closed by a stopping pneumatic signal for stopping said pneumatic motor;
means for applying the starting pneumatic signal to said pilot valve assembly means to open said pilot valve assembly means;
a transfer valve pneumatically connected to said pilot valve assembly means for applying the stopping pneumatic signal to said pilot valve assembly means to close said pilot valve assembly means, said transfer valve having an operating stem extending outwardly from said transfer valve which opens said transfer valve to apply the stopping pneumatic signal to the pilot valve assembly means when depressed;
a delay assembly means including a pneumatically operated piston adapted to depress said operating stem of said transfer valve; and
means operatively associated with said means for operating said valve plug assembly means for actuating said delay assembly means.

12. A soot blower comprising:
a housing defining an inlet passageway with an inner end and an outer end and defining a valve chamber with a valve seat therein located in communication with the inner end of said inlet passageway and further defining an outlet from said valve chamber;
a rotatable supply tube rotatably mounted at the outlet of said valve chamber and in communication therewith;
a valve plug assembly means slidably fitted within said valve chamber and adapted to press against said valve seat to close said outlet from said valve chamber and slide away from said valve seat to open said outlet, said valve plug assembly means including a valve stem which extends outside said housing;
means including a pneumatic motor for supplying rotating motion to said rotatable supply tube;
means associated with said means for applying rotating motion and operatively connected to said valve stem for operating said valve plug assembly means;
a pilot valve assembly means pneumatically connected to said pneumatic motor for starting and stopping said pneumatic motor, said pilot valve assembly means being adapted to be opened by a starting pneumatic signal for starting said pneumatic motor and to be retained opened by a feedback signal passing through said pilot valve assembly means and to be close by a stopping pneumatic signal for stopping said pneumatic motor;
means for applying the starting pneumatic signal to said pilot valve assembly means to open said pilot valve assembly means;
a transfer valve pneumatically connected to said pilot valve assembly means for applying the stopping pneumatic signal to said pilot valve assembly means to close said pilot valve assembly means, said transfer valve having an operating stem extending outwardly from said transfer valve which opens said transfer valve to apply the stopping pneumatic signal to the pilot valve assembly means when depressed;
a delay assembly means including a piston slidably fitted within a cylinder with a rod assembly extending from said piston, said cylinder having an inlet for supplying air behind said piston and outlet for discharging the air from behind said piston, said operating stem of said transfer valve and said rod assembly of said delay assembly means being located on a common longitudinal axis and adjacent one another in a closely spaced relationship; and
means operatively associated with said means for operating said valve plug assembly means for actuating said delay assembly means.

13. A soot blower comprising:
a housing defining an inlet passageway with an inner end and an outer end and defining a valve chamber with a valve seat therein located in communication with the inner end of said inlet passageway and further defining an outlet from said valve chamber;
a rotatable supply tube rotatably mounted at the outlet of said valve chamber and in communication therewith;
a valve plug assembly means slidably fitted within said valve chamber and adapted to press against said valve seat to close said outlet from said valve chamber and slide away from said valve seat to open said outlet, said valve plug assembly means including a valve stem which extends outside said housing;
means including a pneumatic motor for supplying rotating motion to said rotatable supply tube;
means associated with said means for apying rotating motion and operatively connected to said valve stem for operating said valve plug assembly means;
a pilot valve assembly means pneumatically connected to said pneumatic motor for starting and stopping said pneumatic motor, said pilot valve assembly means being adapted to be opened by a starting pneumatic signal for starting said pneumatic motor and to be retained opened by a feedback signal passing through said pilot valve assembly means and to be closed by a stopping pneumatic signal for stopping said pneumatic motor;
means for applying the starting pneumatic signal to said pilot valve assembly means to open said pilot valve assembly means;
a delay assembly means including a piston slidably fitted within a cylinder and a rod assembly secured to said piston, said cylinder having an inlet for supplying air behind said piston and an outlet for discharging the air from behind said piston as quickly as it is supplied, said delay assembly means further tracted position in the absence of air pressure behind said piston;

a bleeder block having a passageway therethrough with an inlet and an outlet, said inlet to said bleeder block being connected to the outlet of said delay assembly means, said outlet being in the form of an aperture for discharging the air from said delay assembly means;

a shut-off link with a flat surface area pivotably mounted adjacent said bleeder block and adapted to pivot said flat surface area against said aperture in said bleeder block to prevent the flow of air through said aperture;

a pivotably mounted bell crank adapted to engage said shut-off link to pivot said shut-off link against said aperture of said bleeder block;

a bell crank cam operatively associated with said bell crank to pivot said bell crank, said bell crank cam having at least one notch located on its periphery adapted to engage the end of said bell crank moving it downwardly to raise the opposite end upwardly against the shut-off link to press the shut-off link against the aperture;

a cam and pawl shaft rotatably supported and having the bell crank cam rigidly mounted therein;

a pawl cam rigidly mounted on said pawl and cam shaft, said pawl cam having notches on its periphery;

a pawl operatively associated with said pawl cam for rotating said pawl cam;

means for connecting said pawl to said means for operating said valve plug assembly means so that said pawl climbs onto the pawl cam engaging the pawl cam at a notch and pushes said pawl cam causing it to rotate thereby moving said shut-off link against said aperture in said bleeder block causing said piston of said delay assembly to force the rod assembly outwardly; and a transfer valve pneumatically connected to said pilot valve for applying the stopping pneumatic signal to said pilot valve assembly means to close said pilot valve assembly means, said transfer valve having an operating stem extending outwardly from said transfer valve which opens said transfer valve to apply the stopping pneumatic signal when depressed, said operating stem of said transfer valve and said rod assembly being located on a common longitudinal axis and adjacent one another in a closely spaced relationship.

14. A soot blower comprising:
a housing defining an inlet passageway with an inner end and an outer end and defining a valve chamber with a valve seat therein located in communication with the inner end of said inlet passageway and further defining an outlet from said valve chamber;

a rotatable supply tube rotatably mounted at the outlet of said valve chamber and in communication therewith;

a valve plug assembly means slidably fitted within said valve chamber and adapted to press against said valve seat to close said outlet from said valve chamber and slide away from said valve seat to open said outlet, said valve plug assembly means including a valve stem which extends outside said housing;

means including a pneumatic motor for supplying rotating motion to said rotatable supply tube;

means associated with said means for applying rotating motion and operatively connected to said valve stem for operating said valve plug assembly means;

a pilot valve assembly means including a pilot valve housing having a pilot chamber therein, a piston slidably fitted within said pilot chamber, said housing defining an air inlet at one end of said pilot valve assembly, said air inlet including an air inlet valve seat, an air inlet valve plug located within said air inlet and adapted to move against said air inlet valve seat to close said air inlet and to move away from said air inlet to open said air inlet, an air inlet valve stem connected to said air inlet valve plug and extending from said air inlet valve plug into said pilot chamber, the end of said air inlet valve stem farthest removed from said air inlet valve plug being located adjacent said piston, and means including a spring located about said valve stem for urging said air inlet valve plug to a closed position against said air inlet valve seat, said housing further defining an air outlet and a trip signal inlet both located between said air inlet and said piston and still further defining a start signal inlet and a feedback inlet on the side of said piston opposite from said air inlet;

means for applying a starting pneumatic signal to said start signal inlet of said pilot valve assembly to move said piston against said air inlet valve stem thereby removing said air inlet valve plug from said air inlet valve seat placing said air inlet in communication with said air outlet;

conduit means for connecting said air outlet with said pneumatic motor to actuate said pneumatic motor and for connecting said air outlet with said feedback inlet to retain said air inlet in communication with said air outlet; and means for automatically applying a stopping pneumatic signal to said trip signal inlet of said pilot valve assembly means to close said pilot valve assembly means.

15. A soot blower according to claim 14 wherein said means for automatically applying a stopping pneumatic signal to said trip signal inlet of said pilot valve assembly means to close said pilot valve assembly means includes:

a transfer valve pneumatically connected to said pilot valve assembly means for applying the stopping pneumatic signal to said pilot valve assembly means, said transfer valve having an operating stem extending outwardly from said transfer valve which opens said transfer valve to apply the stopping pneumatic signal when depressed;

a delay assembly means including a pneumatically operated piston adapted to depress said operating stem of said transfer valve; and means operatively associated with said means for operating said valve plug assembly means for actuating said delay assembly means.

16. A soot blower according to claim 14 wherein said means for automatically applying a stopping pneumatic signal to said trip signal inlet of pilot valve assembly means to close said pilot valve assembly means includes:

a transfer valve pneumatically connected to said trip signal inlet of said pilot valve assembly means for applying the stopping pneumatic signal to said pilot valve assembly means, said transfer valve having an operating stem extending outwardly from said transfer valve which opens said transfer valve to apply the stopping pneumatic signal when depressed;

a delay assembly means including a piston slidably fitted within a cylinder and a rod assembly extending from said piston, said cylinder having an inlet behind said piston and outlet behind said piston, said operating stem of said transfer valve and said rod assembly of said delay assembly means being located on a common longitudinal axis and adjacent one another in closely spaced relationship; and means operatively associated with said means for operating said valve plug assembly means for actuating said delay assembly means.

17. A soot blower according to claim 14 wherein said means for automatically applying a stopping pneumatic signal to said trip signal inlet of said pilot valve assembly means to close said pilot valve assembly means includes:

a delay assembly means including a piston slidably fitted within a cylinder and a rod assembly secured to said piston and an outlet for discharging said air from behind said piston as quickly as it is supplied, said delay assembly means further including a spring for retaining said piston in a retracted position in the absence of air pressure behind said piston;

a bleeder block having a passageway therethrough with an inlet and an outlet, said inlet to said bleeder block being connected to the outlet of said delay assembly means, said outlet being in the form of an aperture for discharging the air from said delay assembly means;

a shut-off link with a flat surface mounted adjacent said bleeder block and adapted to pivot said flat surface area against said aperture in said bleeder block to prevent the flow of air through said aperture;

a pivotably mounted bell crank adapted to engage said shut-off link to pivot said shut-off link against said aperture of said bleeder block;

a bell crank cam operatively associated with said bell crank to pivot said bell crank, said bell crank cam having at least one notch located on its periphery adapted to engage the end of said bell crank moving it downwardly to raise the opposite end upwardly against the shut-of link to press the shut-off link against the aperture;

a cam and pawl shaft rotatably supported and having the bell crank cam rigidly mounted therein;

a pawl cam rigidly mounted on said pawl and cam shaft, said pawl cam having notches on its periphery;

a pawl operatively associated with said pawl cam for rotating said pawl cam;

means for connecting said pawl to said means for operating said valve plug assembly means so that as said pawl climbs onto the pawl cam engaging the pawl cam at a notch and as said valve cam follower drops down on said valve cam, said pawl pushes said pawl cam causing it to rotate, thereby moving said shut-off link against said aperture in said bleeder block causing said piston of said delay assembly to force the rod assembly outwardly; and a transfer valve pneumatically connected to said trip signal inlet of said pilot valve for applying the stopping pneumatic signal to said pilot valve assembly means to close said pilot valve assembly means, said transfer valve having an operating stem extending outwardly from said transfer valve which opens said transfer valve to apply the stopping pneumatic signal when depressed, said operating stem of said transfer valve and said rod assembly being located on a common longitudinal axis and adjacent one another in a closely spaced relationship.

18. A soot blower comprising:

a housing defining an inlet passageway with an inner end and an outer end and defining a valve chamber with a valve seat therein located in communication with the inner end of said inlet passageway and further defining an outlet from said valve chamber;

a rotatable supply tube rotatably mounted at the outlet of said valve chamber and in communication therewith;

a valve plug having a seat face and a stem face slidably fitted within said valve chamber and adapted to press said seat face against said valve seat, said valve plug having an opening therein extending from said stem face to said seat face and with an inner valve seat within said opening located at said seat face and said valve plug having a bleeder passage therein extending from said stem face to a point on said valve plug continuously in communication with said inlet passageway;

a valve stem slidably fitted through said opening in said valve plug and adapted to seat at one end against said inner seat with the opposite end extending through said housing, said valve stem and opening being jointly adapted to permit communication through said valve plug when said valve stem is only slightly withdrawn from said inner valve seat;

a drive shaft rotatably mounted on said housing;

a pinion rigidly secured to said drive shaft;

a gear rigidly secured to said rotatable supply tube, said pinion and said gear being operatively associated with one another;

means including an electric motor adapted to supply rotating motion to said drive shaft;

a valve cam fixedly mounted on said gear so as to rotate as said gear rotates, said valve cam having a periphery with a rise and fall therein;

a valve cam follower means in the form of a relatively straight member pivotably mounted on said housing, said cam follower assembly means having a valve cam wheel at one end and a yoke wheel at the other end, said valve cam wheel being associated with the periphery of said valve cam;

a yoke assembly means in the form of an L-shaped member pivotably mounted on said housing and connected at one end to said valve stem while pressing at the other end against said yoke wheel on said valve cam follower means, said yoke assembly having a plurality of extensions connected to it;

spring means located between said housing and said plurality of extensions to force said yoke assembly upward against said valve cam follower arm means and said valve cam follower arm means against said valve cam;

an electrical circuit for operating said electric motor, said circuit including a starting switch for starting said electric motor and a stopping switch for stopping said electric motor;

a switch cam in mechanical contact with said stopping switch, said switch cam having at least one point on its periphery which permits said stopping switch to open when said point is in contact with said switch;

a cam and pawl shaft rotatably supported and having said switch cam rigidly mounted thereon;

a pawl cam rigidly mounted on said pawl and cam shaft, said pawl cam having notches on its periphery;

a pawl operatively associated with said pawl cam for rotating said pawl cam; and means adapted to connect said pawl to said valve cam follower means so that as said valve cam follower means rides up on said valve cam, said pawl climbs onto the pawl cam at a notch and as said valve cam follower drops down on said valve cam, said pawl pushes said pawl cam causing it to rotate thereby rotating said switch cam to actuate said stopping switch.

References Cited

UNITED STATES PATENTS

| | | | |
|---|---|---|---|
| 2,722,032 | 11/1955 | Demart | 15—317 |
| 1,877,722 | 9/1932 | Rawson | 15—318 |
| 2,110,534 | 3/1938 | Snow et al. | 15—318 |
| 2,730,749 | 1/1956 | Hibner | 15—318 |

FOREIGN PATENTS 637,930  2/1928  France.

ROBERT W. MICHELL, *Primary Examiner.*